United States Patent [19]

Romanauskas

[11] 4,114,803

[45] Sep. 19, 1978

[54] CENTRIFUGE TUBE ENCLOSURE

[75] Inventor: William A. Romanauskas, Southbury, Conn.

[73] Assignee: E. I. Du Pont de Nemours and Company, Wilmington, Del.

[21] Appl. No.: 751,382

[22] Filed: Dec. 17, 1976

[51] Int. Cl.² ............................................ B04B 5/02
[52] U.S. Cl. ..................................... 233/26; 233/1 A
[58] Field of Search ............... 233/26, 27, 28, 1 R, 233/1 A, DIG. 1; 210/DIG. 23, DIG. 24

[56] References Cited

U.S. PATENT DOCUMENTS 3,938,735  2/1976  Wright et al. .................... 233/26 X
3,998,383  12/1976  Romanauskas .................... 233/26

*Primary Examiner*—George H. Krizmanich

[57] ABSTRACT

A vertically oriented centrifuge tube is placed in a rotor cavity or other enclosure, and the open end sealed with a tapered plug. A resilient shell-like cap is placed over the plug such that it is wedged between the plug and the tube. A retaining disc, secured to the open end of the enclosure, wedges the plug and cap into the open end of the centrifuge tube. The mouth of the enclosure is flared to accomodate the plug taper. Alternatively, the flare may be provided by an annular insert, for the cavity, whose interior is flared.

15 Claims, 5 Drawing Figures

CENTRIFUGE TUBE ENCLOSURE

CROSS REFERENCE TO OTHER APPLICATIONS

Other apparatus for providing a seal for centrifuge tubes is described and claimed in an application Ser. No. 596,233, filed July 16, 1975 by William A. Romanauskas, entitled Gradient Separation Apparatus, and assigned to the same assignee as this application.

BACKGROUND OF THE INVENTION

This invention relates to an apparatus for sealing centrifuge tubes and, more particularly, to an apparatus for sealing centrifuge tubes mounted in rotor cavities.

There is described in the said Romanauskas application a seal for a centrifuge tube that is vertically oriented. Vertically oriented tubes are particularly useful in density gradient separations in which the density gradient is reoriented from vertical to horizontal and back to vertical for fractionation.

Tube caps prior to those devised by Romanauskas typically were comprised of three parts and were not satisfactory, particularly with vertically oriented tubes. The parts were not only difficult to assemble and use but also if one were to obtain the requisite sealing, a vise was required to hold the closure while being tightened.

The seal described by Romanauskas is one in which a tapered plug is introduced into a centrifuge tube disposed in a rotor cavity having a flared mouth. The plug is forced down by a threaded disc which bears axially against the plug so as to wedge the wall of the tube between the plug and the flared mouth of the rotor cavity. Because of the resiliency of the tube, a relatively strong, leak proof seal is provided that is effective even under the large pressure forces which occur during the centrifugation of vertically oriented tubes. While these seals perform quite satisfactorily, as the diameter of the tubes increases, leakage can sometimes occur, particularly with larger diameter tubes, i.e., those exceeding one inch and more. The leakage problem increases as a function of the diameter of the tube, rotor speed and attitude of the tube, i.e., as the tube approaches the vertical or is parallel to the rotational axis, the pressures exerted on the tube cap increase appreciably. The need exists, therefore, for a relatively easy to use, reliable cap or closure for centrifuge tubes, particularly for the large diameter tubes.

It is therefore an object of this invention to provide an improved seal for a centrifuge tube.

A further object of this invention is to provide an improved seal for vertically oriented centrifuge tubes.

SUMMARY OF THE INVENTION

In accordance with the preferred embodiment of the invention, a centrifuge rotor for centrifuging a resilient sample container having an open end is constructed to have a rotational axis and a radially spaced elongated enclosure cavity, with an open end and a longitudinal axis generally parallel to the rotational axis, adapted to receive the container. The open cavity end is flared. A first tapered plug and a retainer secured to the cavity end cooperate to wedge the walls of the open end of the container between the plug taper and the flare. A resilient shell-like cap is interposed between the plug and the sample container. The cap has a resiliency equal to or greater than that of either the plug or the container.

In an alternative embodiment, the flare of the open cavity is provided by a ring-like insert loosely fitted in a recess at the cavity opening. The inner wall of the insert is flared. This permits the tube seal some lateral movement during the centrifuge operation which facilitates sealing.

In a particularly preferred embodiment, the cap is shaped to provide a collapsible space between the end face of the plug and the cap so that during centrifugation the fluid pressure against the shaped cap causes it to squeeze against the inner wall of the tube thereby enchancing the seal. Also, the angle between the flared cavity end and the wall of the cavity preferably lies between 1° and 30° while the angle of the taper is less than the flare angle and lies between 0° and less than 30°. Most desirably, the flare angle is about 17° and the taper angle is about 15°.

BRIEF DESCRIPTION OF THE DRAWINGS

Further advantages and features of this invention will become apparent upon consideration of the following description wherein.

DESCRIPTION OF THE PREFERRED EMBODIMENT

While the apparatus of this invention may be used with any centrifuge rotor in which tubes are nestled in rotor cavities, it finds particular use with a vertical rotor. In a vertical rotor, the sample tubes or containers are generally vertically oriented for rotation about a vertical spin axis. Utilizing such vertical orientation has many advantages. Among these are short path lengths (the diameter of the tubes), and hence a relatively steep separation gradient during centrifugation, and a relatively long path length during recovery, i.e., relatively wide separation of bands. Vertical rotors are described more fully in the said Romanauskas application.

Figure 1:
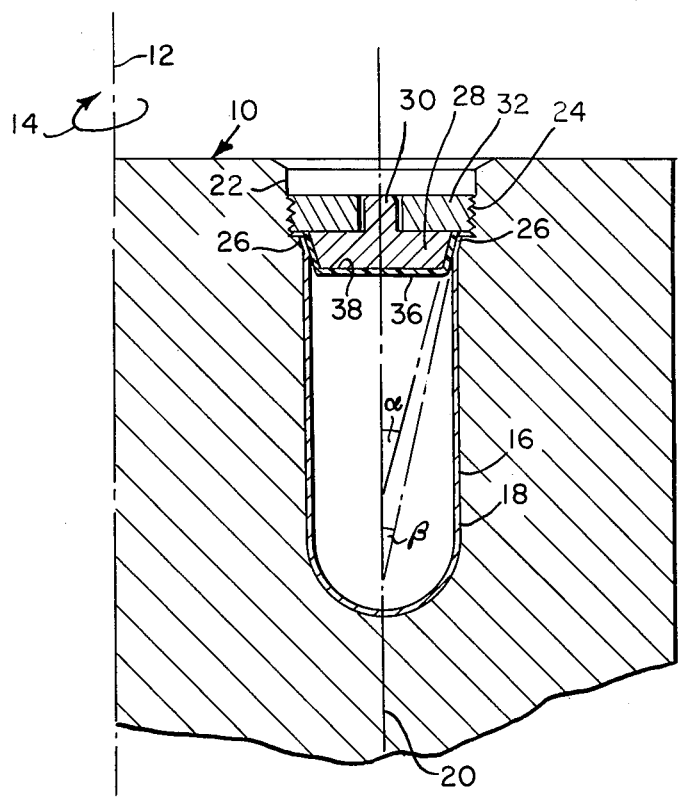
FIG. 1 is a fragmentary cross section, elevation view of a centrifuge rotor partly in schematic typifying a vertically oriented sample container sealed utilizing a rotor seal constructed in accordance with one embodiment of this invention.

Such a vertically oriented rotor is depicted in FIG. 1 in which there is a fragmentary view of a rotor 10 adapted to be spun about a spin axis 12 in the clockwise sense depicted by the arrow 14. The rotor is adapted to hold a plurality (only one of which is shown) of circumferentially spaced sample tubes or containers 16. Each tube is adapted to be vertically inserted into a corresponding cavity 18 formed within the rotor 10 with a sliding fit. The cavity 18 preferably has a vertical axis 20 which is generally parallel to and, when the rotor rotates, spins about the vertically oriented spin axis 12. The rotor is adapted to be driven by any suitable drive means such as a motor or other conventional prime mover (not shown). The tube 16, which may be elongated, is formed of any of the conventional resilient materials that are used for centrifuge tubes. These materials include the polyallomers, cellulose nitrate, nylon and polypropylene. Any other suitably resilient material, as will be described hereinafter, may be used as well.

The top of the cavity 18 is formed with a counterbore 22 which is internally threaded as at 24. The shoulder formed between the counterbore 22 and the cavity 18, is located at the point corresponding to the lip of the tube 16. This shoulder or upper portion of the cavity 18, is slanted outwardly or flared as at 26 to accomodate tapered plug 28. The plug may have a stem 30 to facilitate its removal following centrifugation. A retaining disc or cover 32 in the form of an annular ring or disc engages the threads 24 and loosely fits over the stem 30. The disc 32 urges the plug axially downward into the cavity 18 so as to wedge the thin resilient walls of the tube 16 between the taper of the plug and the shoulder flare 26. The resilience of the tube 16 provides a fluid tight seal that is relatively secure and permits rotor speeds up to 65,000 revolutions per minute (rpm) and above. Lateral movement of the plug 28 within the limits permitted by the resilience of the tube walls is permitted by the loose fit of the stem 30 in the cover 32. When completely assembled, there should be a clearance between the shoulder 26 and the cover 32.

In accordance with this invention, a resilient, shell-like cap 36 is fitted over the tapered portion of the plug 28, including the inner (lower in the drawing) end face 38 so as to interface between the tapered plug 28 and the lip of the tube 16. This has several advantages. One of these advantages is that the fluids within the tube 16 are now totally enclosed with plastic, i.e., the tube 16 and the cap 36. Preferably, the cap 36 is formed of a material that has a degree of resiliency equal to or greater than the resiliency of either the tube 16 or the plug 28. A suitable material for this is low molecular weight polyethylene, which is particularly desirable in that it is softer, more deformable and more resilient than the typical materials used for centrifuge tubes. Any of the other known plastics that are non-reactive with the tube's contents and have sufficient tensile strength and the desired lower resilience may also be used. This added resiliency permits more freedom of relative movement of the several parts to accomodate mechanical stresses which occur during centrifugation. In this connection, it may be noted that if cellulose nitrate tubes are used, a typical silicone grease is desirably used since the cellulose nitrate tubes tend to be more brittle than those constructed with the other materials.

Further in accordance with the invention, the taper of the plug should be less than or equal to the taper or flare of the mouth of the cavity 18. Stated more precisely, in a preferred embodiment of the invention, the angle $\alpha$ of the taper of the plug, which may be defined as the angle formed between the projection of the periphery of the plug and the axis 20, may vary between 0° and an angle of less than 30°. The angle $\beta$ of the shoulder or flare 26 may vary between 1° and 30° — the angle $\beta$ of the shoulder being defined as the angle between the axis 20 and the projection of the flare on the axis. In a preferred embodiment of the invention, the angle $\beta$ of the flare is about 16° where the taper angle $\alpha$ is 2° less, or about 14°. The problem encountered here with variation of the angles is that as the angles become too small, i.e., approach zero, the plug becomes more difficult to remove, whereas as the angles $\alpha$ and $\beta$ approach 30° or more, it requires more axial force in order to maintain the requisite wedging to provide an adequate seal.

In another alternative embodiment of the invention, the flare, instead of being a bevel or straight line, may be a rounded shoulder.

The plug may be formed of a metal such as aluminum or, more preferably, it is formed of one of the acetal resins, such as Delrin, a trademark of E. I. du Pont de Nemours and Company, Wilmington, Delaware.

In use, a tube 16 is introduced into the cavity 18 and fluid introduced therein. The plug 28 with the cap 36 thereover is then lightly wedged into the open end of the tube and the cover 32 threaded into the threads 24. The cover 32 may be provided with wrench slots (not shown) to facilitate its tightening. As the cover 32 is tightened, it applies axial pressure against the plug 28 and cap 36 thus wedging the cap 36 between the tube 16 and the taper of the plug. The lip of the tube is expanded outwardly to conform to the flare, of the cavity providing a relatively tight seal, due primarily to the resiliency of the cap.

Figure 2:
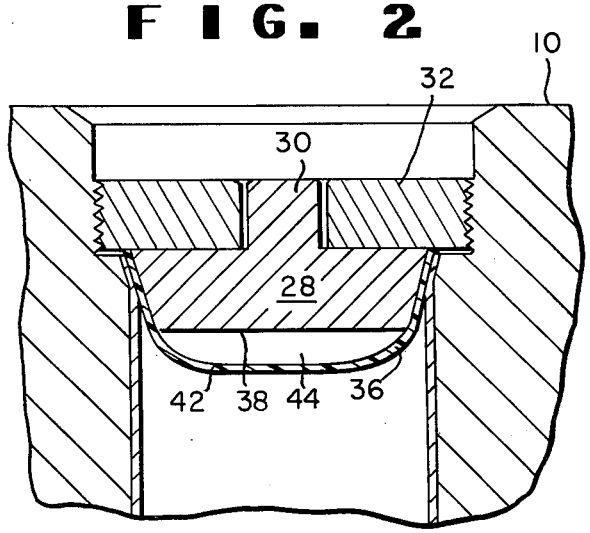
FIG. 2 is a fragmentary cross sectional elevation view of a rotor seal constructed in accordance with another embodiment of this invention.
Figure 3:
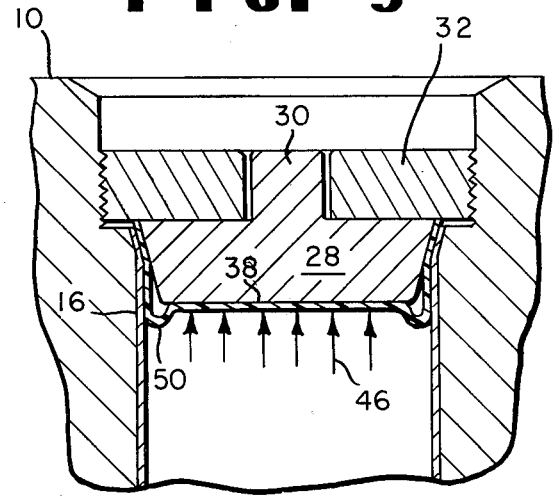
FIG. 3 is a fragmentary cross sectional elevation view of the centrifuge rotor seal illustrated in FIG. 2 and depressed under typical operating conditions which occur during centrifugation.

In still another embodiment of the invention, as depicted in FIG. 2, the portion of the cap 36 covering the end face 38 may be bulbous shaped as at 42 to provide a collapsible space 44 between the end face 38 and the bulbous portion 42. In this manner, when the cap is used, the pressure, depicted by the arrows 46 in FIG. 3, of the fluid in the tube acting upwardly cause the bulbous portion 42 to flatten itself against the end face 38 of the plug 28 permitting the peripheral portions 50 of the cap to squeeze peripherally outward against the inner walls of the tube 26 further enhancing the sealing.

Figure 4:
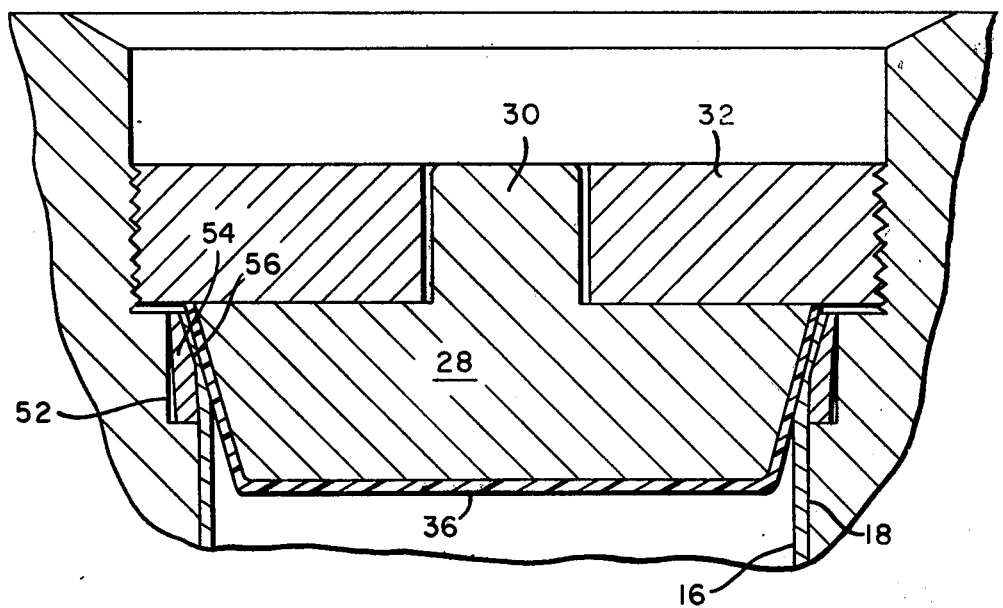
FIG. 4 is a fragmentary cross sectional elevation view of a rotor tube cap constructed in accordance with a preferred embodiment of this invention.

A further embodiment of the invention is depicted in FIG. 4. In this embodiment, the construction is precisely the same as those previously described with the exception that the flare at the mouth of the cavity 18 is provided by first forming a second counterbore 52 between the cavity 18 and the first counterbore 22. An annular element or ring 54 is fitted into the second counterbore. The ring 54 has an outer diameter slightly less than the inner diameter of the counterbore 52. Preferably, the relationship between the diameters is such to provide a 5 to 10 mil spacing between the ring and the second counterbore. The upper portion of the inner wall 56 of the ring is tapered outwardly and upwardly (in the drawing) either with a bevel 56 or with a rounded shoulder as previously described to provide the described flare. With this structure, the sealing operation is the same with the exception that the plug 28 is now bearing against the ring 54 which is movable laterally to a slight degree. This freedom of movement permits the ring to distort somewhat and accomodate itself to the various forces which occur during the centrifugal operation. Further, the ring is permitted to expand where required, and to accomodate itself generally to the contours and configurations generated by the centrifugal forces of the several elements interacting together.

In fact, when the tapered plug is seated prior to operation of the centrifuge, the upper edge of the insert 54 expands slightly as is illustrated in FIG. 4. The result is that the sealing surfaces are held in intimate contact even if there is a slight relative lateral movement or distortion between the sealing surfaces.

Figure 5:
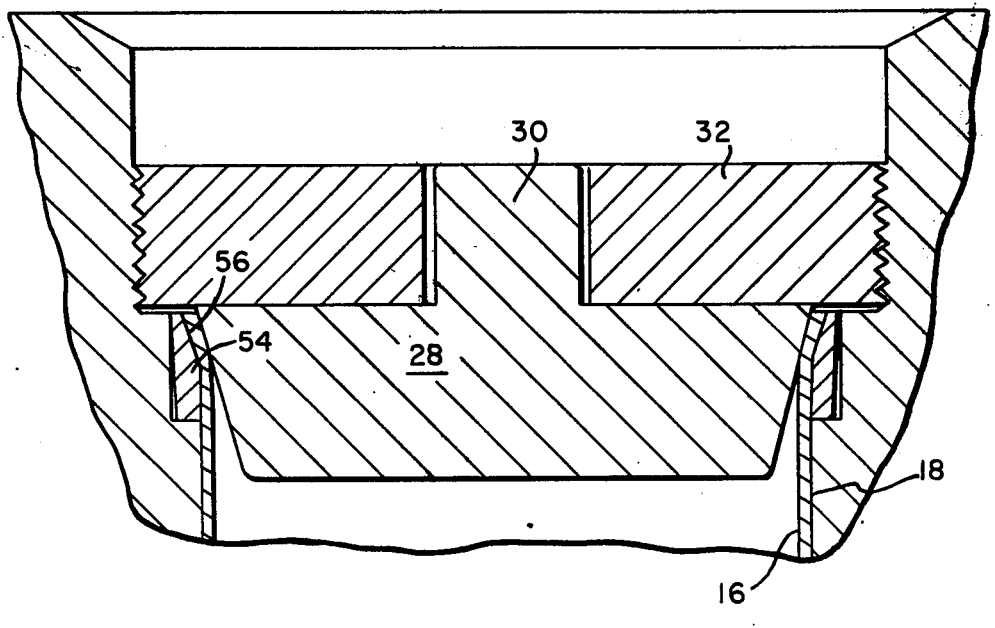
FIG. 5 is a fragmentary cross sectional elevation view of a centrifuge rotor tube cap constructed in accordance with still another alternative embodiment of this invention.

In still another embodiment of the invention, as depicted in FIG. 5, the ring 54 is used in a configuration with the plug 28 alone without the cap 36. With this exception, the remaining structure is exactly the same with the ring providing some of the mechanical resiliency heretofore provided by the addition of the cap 36. In all of these various embodiments, the various angle of the parts are the same as the angles α and β (FIG. 1).

In summary, the seal provided by this invention relies upon increased resiliency and movement of the parts. This increase in resiliency and movement is provided in one instance by the ring 54, which is movable and distensible to accomodate itself to the various forces generated during centrifugal operation. Alternatively, the resiliencies provided by the addition of the resilient cap 36, which fits over the tapered plug and provides the further advantage of protecting the plug or the contents of the tube from the plug itself. This is particularly advantageous where the plug is of metal and prevents metal ions from becoming part of the tube's contents.

I claim:

1. In a centrifuge rotor for centrifuging a sample in a resilient sample container having an open end, said rotor having a rotational axis and a radially spaced cavity with an open end and an axis through said open end generally parallel to said rotational axis for receiving said container, said open cavity end being flared, a first tapered plug, and a retainer secured to said open cavity end for wedging the walls of the open end of said container between said plug taper and said flare, the improvement of:

a resilient shell-like cap interposed between said plug and said container, said cap having a resiliency equal to or greater than that of either said plug or said container.

2. The centrifuge rotor of claim 1 wherein said cap is in intimate contact with the end face of said plug.

3. The centrifuge rotor of claim 1 wherein said plug has a generally flat end face and said cap is bulbous shaped to provide a collapsible space between the end face of said plug and said cap.

4. The centrifuge rotor of claim 1 wherein the angle β between said flared cavity end and the axis of said cavity lies between 1° and 30° and the angle α of said taper relative to the axis of said cavity is less than said flare angle β and lies between 0° and an angle less than 30°.

5. The centrifuge rotor of claim 4 wherein said flare angle β is about 17° and said taper angle α is about 15°.

6. The centrifuge rotor of claim 1 wherein said open cavity end defines a recess, and which includes a ringlike insert fitted in said recess, the inner wall of said insert being flared outwardly, whereby the open end of said container walls and said cap are wedged together and between said plug and said insert.

7. The centrifuge rotor of claim 6 wherein the outer diameter of said insert is less than the inside diameter of said recess.

8. The centrifuge rotor of claim 7 wherein the angle of said flared insert inner wall relative to said cavity wall lies between 1° and 30° and the angle of said taper relative to the axis of said cavity is less than said flare angle and lies between 0° and an angle less than 30°.

9. The centrifuge rotor of claim 8 wherein said flare angle is about 17° and said taper angle is about 15°.

10. In a centrifuge rotor for centrifuging a resilient sample container having an open end, said rotor having a rotational axis and a radially spaced cavity with an open end and an axis through said open end generally parallel to said rotational axis for receiving said container, said open cavity end being flared, a first tapered plug, and a retainer secured to said open cavity end for wedging the walls of the open end of said container between said plug taper and said flare, the improvement of:

an annular recess formed in the open end of said cavity; and a ringlike insert fitted in said recess, the inner wall of said insert being flared outwardly, whereby the open end of said container wall is wedged between said plug and said insert.

11. The centrifuge rotor of claim 10 wherein the outer diameter of said insert is less than the inside diameter of said recess.

12. The centrifuge rotor of claim 11 wherein the angle of said flared insert inner wall relative to said cavity wall lies between 1° and 30° and the angle of said taper relative to the axis of said cavity is less than said flare angle and lies between 0° and an angle less than 30°

13. The centrifuge rotor of claim 12 wherein said flare angle is about 17° and said taper angle is about 15.

14. A centrifuge rotor having:

a rotational axis;

a plurality of equally radially and circumferentially spaced elongated cavities, each defined by a bore closed at one end and a first counterbore, each having a common axis substantially parallel to said rotational axis, each said bore being flared outwardly at said counterbore;

a tapered plug fitted in the flared open end of each said bore;

a second plug secured in each said first counterbore for rigidly supporting said tapered plug against axial movement; and a resilient shell-like cap interposed between said plug and said flared open end of each said bore, for wedging the open end of a container between said plug and cap on the one hand and said flared bore on the other.

15. The centrifuge rotor of claim 14 wherein said flared open end is defined by a second counterbore between said first counterbore and said cavity, and an annular insert loosely fitted in said second counterbore.

* * * * *